United States Patent Office 3,605,439
Patented Sept. 20, 1971

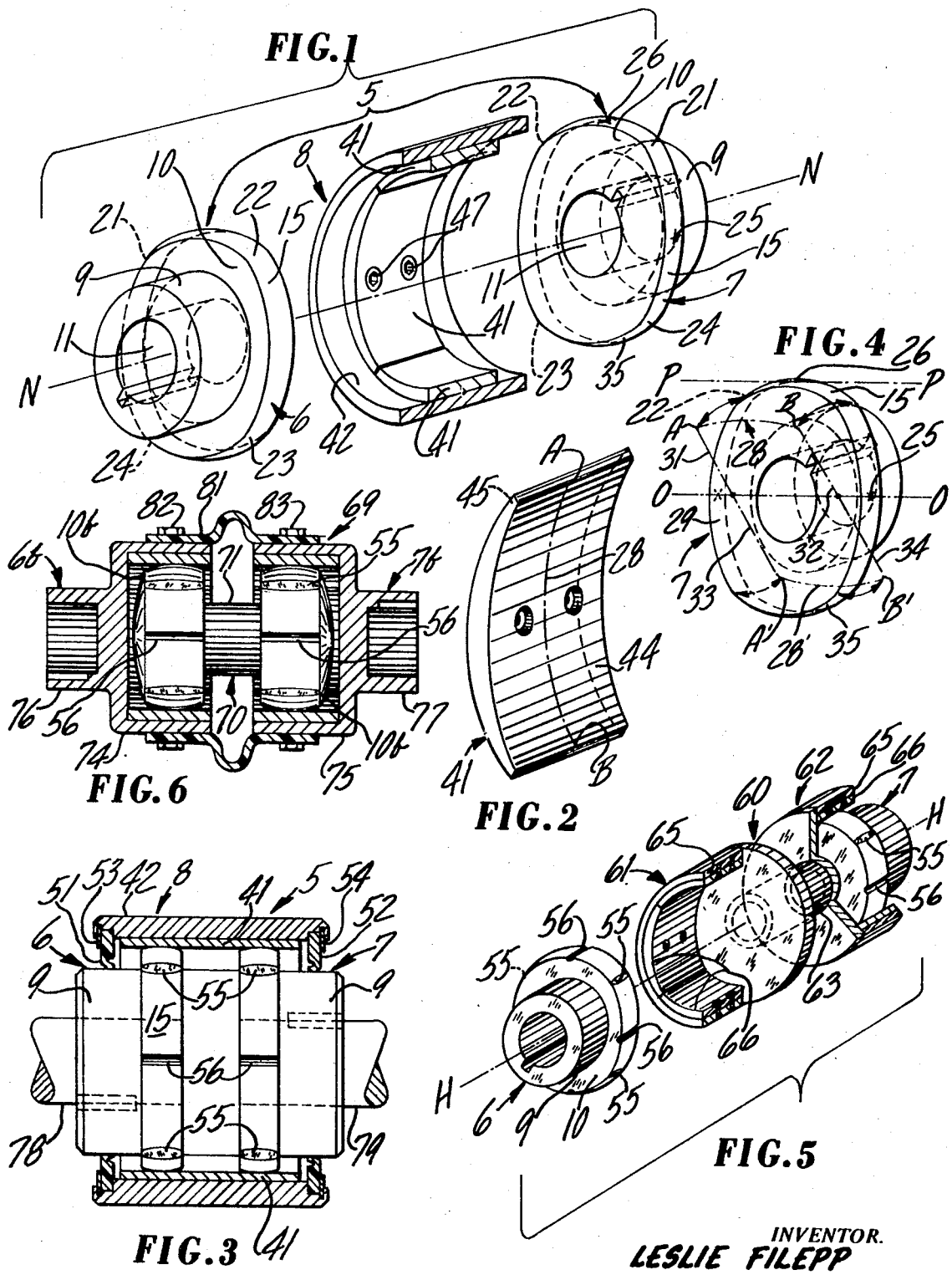

1

3,605,439
TORSION DRIVE COUPLING
Leslie Filepp, Colts Neck, N.J., assignor to
Midland-Ross Corporation, Cleveland, Ohio
Filed May 8, 1970, Ser. No. 35,647
Int. Cl. F16d *3/18*
U.S. Cl. 64—9R                12 Claims

ABSTRACT OF THE DISCLOSURE

A gear-type coupling for connecting in-line shafts in driving relationship. Basic parts of the coupling are a pair of shaft-receiving hubs and a double-ended sleeve or spacer for receiving the hubs. The cooperating external and internal tooth surfaces of the parts are based on a four-tooth configuration resulting in a somewhat quadratic pattern of radially-outwardly convex sides.

---

Couplings of the type herein contemplated are particularly suited for heavy duty use, such as in the drive transmission of rolling mills receiving steel. Such couplings are normally operated at low rates of rotation but are subject to sudden loading and adjustment to considerable variation in shaft misalignment. Due to the technical trends in the steel industry, there is a constant trend upward in the capacities required of such couplings, especially as to their capacity ratings at misaligned conditions. As the number of teeth is increased and the size thereof is decreased to distribute the load to more than two sets of internal and external teeth during misalignment, the root stress on the teeth increases in direct ratio to the number of teeth. In changing the number of teeth, the so-called "Hertz" stress varies in inverse ratio to the cube root of the number of teeth. The present invention contemplates an optimum number of teeth based on a complementary external and internal tooth configuration which provides extremely low root stresses but permits toleration of very high Hertz stresses. To those familiar with this art, Hertz stress is a term describing a concentration of compression and shear stress developed within engaged teeth just under respective surfaces of contact. The high load transmitting capacity of the coupling herein disclosed results especially from utilization of special construction and shaping of parts which permit extremely accurate construction of the parts from wear resistant materials at costs which would be otherwise substantially higher.

It is an important object of this invention to provide a coupling of a type deemed herein most properly as a gear coupling for connecting shafts or other rotatable objects in torsional drive relationship with a view to optimizing the number of teeth entering into drive relationship at misaligned shaft conditions with the capability of sustaining very high loading without exceeding tolerable root stress and Hertz stress levels.

Another object is to provide a coupling which is easily and economically manufactured in view of the high load capacities desired.

It is also an object to construct a coupling with replaceable internal gear elements which may be economically manufactured from premium materials.

Still another object is to provide a coupling having an outer internal tooth assembly capable of flexibly deforming to increase the contact between internal and external teeth thereby permitting greater distribution of torsion loads throughout the coupling.

A further object is to construct a coupling in accordance with the foregoing objects which retains and circulates a lubricant.

The above objects and other apparent from this disclosure are achieved in a coupling comprising three members having male and female portions by which the members are disposed in end-to-end relationship and coupled together by axially overlapping of cooperating male and female portions thereof. These members include an intermediate double-ended member and two shaft-receiving hub members having hub portions of which each provides a bore for one of a pair of shafts to be supported in approximately coaxial alignment. The male portions of the members comprise four identical teeth spaced equiangularly about the axis of rotation of the respective member, but the shape of the teeth being such that the radially outer peripheral surfaces of the teeth are convex in the axial direction of the coupling and the adjacent sides of adjacent teeth form an arc, i.e., a portion of a circle along a transaxial plane which bulges radially outwardly. Each of the female portions has an internal peripheral surface of uniform transaxial cross section which has concave areas which conform substantially to the four circle portions formed by the teeth whereby such internal surface is rendered generally complementary to the outer periphery of the male portion received thereby. The engagement of the convex tooth areas with concave internal surface areas results in greater interfacial contact between members and thus relatively lower Hertz stresses.

In one preferred embodiment, the female portions each comprise a sleeve of annular cross section and detachable segments secured therewithin which define the above-mentioned internal peripheral surface. In this or another embodiment, the double-ended member may be constructed to dispose crowns of teeth associated with one of its ends displaced 45 degrees about the axis of the member with respect to the crowns of teeth associated with the other end of the double-ended member.

In the drawing with respect to which the invention is described:

FIG. 1 is an exploded perspective view, with portions in section, of a coupling in accordance with one embodiment of the invention;

FIG. 2 is a perspective view of one of the segments used within a female portion of a coupling member to peripherally confine a male gear portion;

FIG. 3 is a longitudinal view of a coupling similar to that shown in FIG. 1 with the double-ended intermediate member and sealing structure associated therewith sectioned along a longitudinal diametral plane;

FIG. 4 is a perspective view of a hub member such as used in the embodiment of FIGS. 1 and 3, illustrating generatrices for peripheral surface portions of a gear portion of a member;

FIG. 5 is a perspective exploded view of a modified coupling showing the intermediate double-ended member with portions in section; and FIG. 6 is an elevation with portions in section wherein male and female portions of the members are reversed with respect to embodiments of FIGS. 1, 3 and 5.

FIGS. 1, 2, 3, and 4 relate to a coupling 5 and parts thereof which illustrate one embodiment of the invention. As shown in the exploded view of FIG. 1, the main parts of the coupling are hub members 6, 7 shown as identical, and a double-ended intermediate member 8 shown in section along a diametral plane. Each hub member 6, 7 has a hub 9 and a tooth or gear plate 10. Each hub member and the double-ended member 8 is symmetrical with respect to its own longitudinal axis which, in FIG. 1, happens to be a single axis N—N along which the three members are shown coaxially disposed. The hub members 6, 7 have shaft-receiving bores 11 which are concentric with respective longitudinal axes of the hub members.

As a special feature of the invention, the outer surface 15 of the plate 10 of each hub member is of crown configuration by which it is radially-outwardly convex in the longitudinal or axial direction of the coupling and radially-outwardly convex or arcuate in the transverse or transaxial direction of the coupling. As shown, the surface 15 has four peaks which are approximately at points which correspond to crowns of the gear teeth 21, 22, 23, 24. The lead lines for these numerals lead to respective crown points of the teeth. The base of any particular tooth may be said to commence halfway between one of these two adjacent crown points. For example, the bases of teeth 21, 22 would be the midpoint 25 therebetween. In a like manner, the base point for the adjacent sides of teeth 21, 22 is point 26. The tooth 21 may then be said to extend from point 25 to 26 along the surface 15. In a similar manner, the three other teeth 22, 23, 24 may be identified by those areas of the plate 10 extending between successive midpoints between the peaks or crowns of the surface 15.

As required by this invention, the area between any two tooth crowns or peaks is the arc of a true circle having a radius substantially larger than the distance from any point of the surface 15 to the axis of the respective hub member. The hub member may be proportioned satisfactorily by constructing it with an axial length equal approximately to the diameter of the shaft bore 11, the minimum diametral dimension of the tooth plate 10 being approximately twice the bore diameter, and a radius for any of the four arcuate areas extending between two adjacent tooth points being twice the bore axis. The radius of curvature of the surface between tooth crowns may also be said to be approximately equal to the minimum diametral dimension of the tooth plate 10. Such a radius defines the curvature of the tooth plate in a transaxial plane.

The curvature of the surface 15, as measured in a longitudinal or axial direction of the coupling, is described with reference to FIG. 4 wherein hub member 7 is shown in connection with a generatrix 28 extending between points A and B. Generatrix 28 is of the same curvature in a transverse plane as just described with respect to an area connecting any two peaks of adjacent teeth. A tangent P—P is tangent to point 26 which is a midpoint in surface 15 between the crowns of teeth 21, 22. A diametrically extending axis O—O and the tangent P—P are parallel and may be assumed as lying within a plane parallel to a front face 29 of the gear plate of the hub member 7. This plane is disposed halfway between the face 29 and a rear face of the plate. In defining the four arcuate areas which constitute the side surfaces of the four teeth, the generatrix 28 may revolve at the end of equal radii 31, 32 to generate one of the four transversely arcuate peripheral areas such as the one containing midpoint 26. In a similar manner, a generatrix 28' extending between points A'B' shown in planar relation with the generatrix 28 may revolve about the axis O—O on equal radii 33, 34 (equal in length to radii 31, 32) to generate an arcuate area 35 of the surface 15. The other two arcuate areas of surface 15 may be generated in this manner also.

FIG. 2 illustrates a segment 41 which is removable from a sleeve 42 of the double-ended member 8. The radially inner face 44 of the segment has the same curvature as the generatrices 28 and 28' of which generatrix 28 is superimposed on the inner surface 44. The outer surface 45 of the segment 41 is formed to a different curvature, i.e., that of the inner surface of the sleeve 42. It is shown in FIG. 1 that the segments 41 are secured, as by cap screws 47, to the sleeve. The double-ended member 8 comprises four segments which correspond in circumferential length to each of the four arcuate areas of the surface 15 of the hub member 9 or 10.

FIG. 3 is basically the coupling illustrated in FIG. 1 with sealing mechanism shown and provision made on the hub members for the circulation of lubricant internally of the coupling. The sealing structure comprises annular washers 51, 52 or rubber or rubberlike resilient material seated within counterbore areas in each end of the sleeve 42. The internal diameters of the rings 51, 52 are such as to match the external diameters of the hubs 9 of the members 6, 7 permitting the interior of the coupling to be packed with a lubricant and retained therein. Snap rings 53, 54 fit into grooves within the end portions of the sleeve 42 and partially radially overlap the washers as shown in FIG. 3, to secure the washers 51, 52, respectively, within the counterbores provided therefor.

The hub members 6, 7 as shown in FIG. 3 are slightly modified with respect to those shown in FIG. 1 to provide flat surfaces 55 at the nodes or peaks of the teeth 21, 22, 23, 24. Surfaces 55 are also shown in perspective on member 6 of FIG. 5. These surfaces are readily obtained by minor grinding of the members as shown in FIG. 1. For further implementation of lubrication, the members 6, 7 may be provided with grooves 56 which extend across surfaces 15 in the longitudinal direction of the coupling, as shown in FIGS. 3, 5 and 6. These grooves occur at midpoints of the arcuate areas of the gear surface 15.

FIG. 5 is especially notable for its disclosure of (1) a double-ended intermediate member 60 which is, in essence, the intermediate member 8 of FIG. 1 cut into cuplike halves or sockets 61, 62 and joined by a coaxial tubelike spacing element 63. Each socket 61, 62 comprises an outer sleeve 65 and four arcuate segments 66, which are separable from the sleeve 61 by removing fasteners such as the cap screws 47 shown.

The embodiment of FIG. 5 is notable in another important respect in that the nodes or crowns of the four teeth of hub member 6 are angularly displaced about the axis H—H with respect to similar nodes of the other hub member 7 of the coupling. The nodes of member 6, because of the modification mentioned above, are indicated by flat surfaces 55. The sockets 61, 62 are similarly angularly displaced to provide cooperating relationship of the segments 66. Such arrangement avoids a slight tendency characteristic of the coupling as shown in FIG. 1 to have the velocity of the driven shaft vary during a single revolution with respect to the rate of rotation of the driving shaft. The practical effect is to redistribute four driving pulses during a single revolution sustained by the driven shaft to eight much smaller pulses to obtain virtually vibrationless torsion transmission which may be required in certain applications of the couplings herein disclosed.

FIG. 6 illustrates a coupling 69 in which cooperating male and female portions are reversed with respect to the embodiment shown in FIG. 5. The coupling 69 comprises a double-ended member 70 having gear plates 10b similar to plates 10 of the hub members and connected by a spacer element 71 in integral relation with plates 10b. The hub members 6b, 7b comprise sockets 74, 75, respectively, which are similar to the sockets 61, 62 of the double-ended member 60 of FIG. 5. In integral relation with the sockets 74, 75 are hubs 76, 77, respectively, capable of receiving shafts to be connected in torsional relationship, such as shafts 78, 79 of FIG. 3.

The gear plates 10b of the intermediate member 70 are provided, as hereinbefore described respecting other embodiments, with flat surfaces 55 and grooves 56 to facilitate lubrication of the interior working surfaces of the coupling. The outer surfaces of the sockets 74, 75 receive a sleeve 81 of resilient flexible material clamped thereto by bands 82, 83. The purpose of the sleeve 81 is to seal the internal region of the coupling 69 from the atmosphere and render it capable of storing a lubricant. Because of the expansion and contraction of the internal region of the coupling 69 in the event of axial movement of the hub members 6b, 7b, the internal region of the coupling should be only partially filled with lubricant.

In the operation of the various couplings herein illustrated and described, distribution of lubricant between the gear or male portions of the members and the female or enclosing sockets or sleeves results in slight movements of the lubricant through the passageways afforded between the female and male portions by the grooves 56 and flat surfaces 55. Relative longitudinal movements or tilting movements result in pumping of the lubricant through such passageways.

Since couplings constructed as herein disclosed have universal action between each hub member and the double-ended member, and the hub members are longitudinally traversable within the opposite ends of the intermediate member, it is obvious that couplings according to the present invention have the capability, in a limited sense, for accommodating all types of misalignment and need for relative adjustment that can occur between two spaced approximately aligned shafts. While the assembled couplings of FIGS. 3 and 6 are shown with members in coaxial relationship, the members of such couplings in operation normally shift out of coaxial relationship and respective axes of the members may assume a serpentine path through the coupling.

While the female portions of the members are disclosed with removable segments 41 for the narrower versions as shown in members 60, 6b and 7b, these members may be constructed with integral segments for many applications of the couplings. However, construction with removable segments, especially if the segments are slightly separated as shown in FIG. 1, permits functioning of the coupling according to an important advantage to be achieved from this design. With removable segments spaced slightly from each other and the encompassing supporting sleeve constructed to a thinness permitting it to resiliently deform to an elliptical shape, contact of the gear plate with the segments during misaligned shaft operation shifts from two-tooth contact to four-tooth contact. It is thus possible during high loading to distribute wear and high stress generation throughout the entire periphery or circumference of both ends of the coupling. This is an uncommon result in the field of gear couplings.

A further advantage derived from construction as herein disclosed, especially in the use of removable segments, is the possibility of constructing the segments of extremely wear-resistant alloys to provide a coupling having a low overall cost when its durability is considered. The removable segments are more easily finished than when integralized with the sleeve or socket structure. The construction throughout the coupling is such that the surfaces which engage in sliding relation may be constructed from wear resistant materials, such as the so-called "Maraging" steels with such surfaces being conveniently shaped by grinding equipment. Such surfaces will ordinarily be subjected to a distorting heat treatment. For example, the hub members 6 and 7 may be constructed as slightly oversize blanks, then heat-treated, and then ground within a tool in which a rotating grinding element shaped in accordance with the generatrices 28, 28' is shifted relative to the axis O—O to shape in one pass an arcuate area, or two such areas simultaneously, to the desired longitudinal and transverse curvatures.

What is claimed is:

1. A coupling for joining a pair of shafts in driving relationship comprising:
    a double-ended member;
    two shaft-receiving hub members having hubs each providing a bore for receiving one of two shafts received by the coupling in spaced approximately-axial alignment during operation;
    said members each having an axis of rotation and being structurally interrelated to maintain said axes in a path through said coupling varying from straight to serpentine;
    said members having male and female portions in coupled relationship disposing said hub members in connection with opposite ends of said double-ended member;
    each of said male portions comprising four identical teeth spaced equi-angularly about its axis of rotation, the shape of said teeth being such that the radially outer peripheral surface of the teeth comprises four areas which are convex in the axial direction of the coupling, and each area consists of adjacent sides of adjacent teeth which form a portion of a circle in a trans-axial plane, said areas being of generally equal length in said plane;
    each of said female portions having an internal peripheral surface which, as measured along any trans-axial plane along its length, extends in concave conformity to said circle portions symmetrically about the axis of the parent member to render said internal surface complementary to the outer periphery of the male portion received thereby.

2. The coupling of claim 1 wherein:
the radius of said circle portions is equal to approximately twice the diameter of said bores.

3. The coupling of claim 2 wherein:
the convexness of said peripheral surfaces along any of said circle portions is defined by revolution of a generatrix conforming with one of said circle portions about a transverse axis bisecting the adjacent circle portions and intersecting the hub axis.

4. The coupling of claim 1 wherein:
a female portion comprises an outer sleeve element and detachably secured segments defining said internal peripheral surface secured along the inner surface of the sleeve element.

5. The coupling of claim 1 wherein:
at least one of said female portions comprises an outer sleeve element and four detachable segments secured along the inner surface of the element, said segments being shaped to define said internal peripheral surface and to have end surfaces in abutting relationship within corner portions of said internal peripheral surface adjacent to the crown surfaces of said teeth.

6. The coupling of claim 5 wherein:
said segments are foreshortened to provide a slight clearance between adjacent end surfaces of the segments; and
said sleeve is constructed to a thickness providing flexibility under operating conditions.

7. The coupling of claim 1 wherein:
one of said hub members comprises one of said male portions and said double-ended member comprises one of said female portions in cooperative relationship with said one hub member.

8. The coupling of claim 1 wherein:
one of said hub members comprises one of said female portions and said double-ended member comprises one of said male portions in cooperative relationship with said one hub member.

9. The coupling of claim 1 wherein:
said double-ended member comprises a pair of said male and female portions in axially spaced relationship, and a spacing element in integral intermediate coaxial relation with both of said pair of portions.

10. The coupling of claim 1 wherein:
the cooperating male and female portions at one end of said double-ended member have corner surfaces disposed at an angle of forty-five degrees about said member's axis with respect to corner surfaces of the cooperating male and female portions at the other end of said member.

11. The coupling of claim 1 wherein:

annular resilient sealing means disposed between opposite ends of said double-ended member and the adjacent hub member are secured to one of the members to enclose a region within the coupling from the atmosphere; and any two members having portions in axially coextending relationship are relatively shaped to provide axially-extending passageways along coextending opposed surfaces of said two members for passage of lubricant.

12. The coupling of claim 11 wherein:

the crowns of said teeth have flattened areas to provide said passageways.

References Cited
UNITED STATES PATENTS

| | | | |
|---|---|---|---|
| 2,906,106 | 9/1959 | Haas | 64—9 |
| 2,976,702 | 3/1961 | Pietsch | 64—9X |
| 3,408,829 | 11/1968 | Gage | 64—9 |

KENNETH W. SPRAGUE, Primary Examiner

U.S. Cl. X.R.

64—16